Aug. 31, 1965    J. WERNER    3,203,727
VEHICLE ROOF

Filed Sept. 25, 1963    2 Sheets-Sheet 1

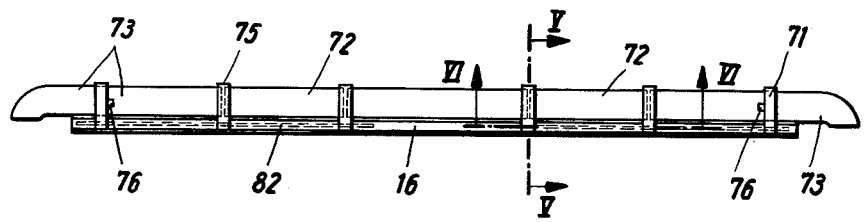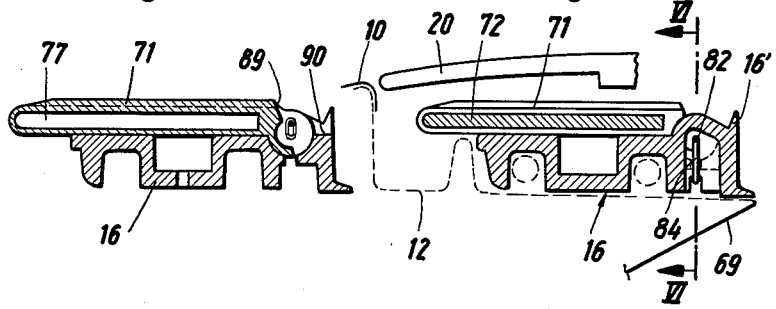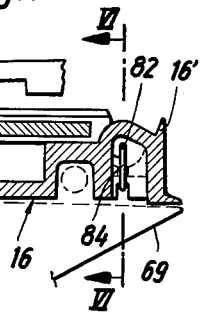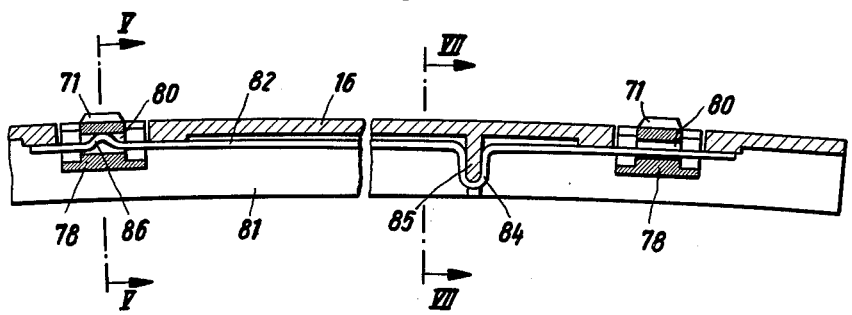

United States Patent Office 3,203,727
Patented Aug. 31, 1965

3,203,727
VEHICLE ROOF
Johannes Werner, Offenbach am Main, Germany, assignor to H. T. Golde G.m.b.H., & Co. K.G., Frankfurt am Main, Germany
Filed Sept. 25, 1963, Ser. No. 311,571
Claims priority, application Germany, Sept. 26, 1962, G 36,005
6 Claims. (Cl. 296—91)

This invention relates to a vehicle roof.

The invention relates more specifically to a vehicle roof having a roof aperture which can be closed by a sliding roof, the vehicle having wind deflecting means pivotably positioned on the front edge of the roof aperture such that said means, when in its inoperative position, is disposed under the closed sliding roof and, during the opening of the sliding roof, is pivoted upwardly into an operative position above the roof aperture and extending transversely to the air current. Such wind deflecting means, as is well known in the art, operate to protect passengers in the vehicle from incoming air currents by deflecting the air currents upwardly and away from the aperture at the front thereof.

It is an object of the present invention to create such wind deflecting means which requires a minimum of space when in inoperative position and which is moved automatically from the inoperative position to the operative position as soon as the sliding roof is opened, while it is returned automatically to the inoperative position when the sliding roof is being closed.

It is another object of the invention so to provide wind-deflecting means that is able to adapt itself automatically to the transverse curvature of the vehicle roof.

According to the present invention, there is provided a vehicle roof comprising a fixed roof part, portions of said fixed roof part defining an aperture therein, a movable roof part displaceable lengthwise of the vehicle roof between a closed position in which said movable roof part closes said aperture and an open position, bearing means fixedly mounted at the foremost side of said aperture and extending widthwise of the vehicle roof, a plurality of arms spaced apart from each other along said bearing means, pivotally mounted on said bearing means, and each turnable between a raised position and a lowered position, wind-deflecting means carried by said arms and movable by said arms between an inoperative position and an operative position in which said wind-deflecting means projects upwardly from said fixed roof part, and spring means urging said arms into the raised positions and said wind-deflecting means into said operative position.

Figure 1:
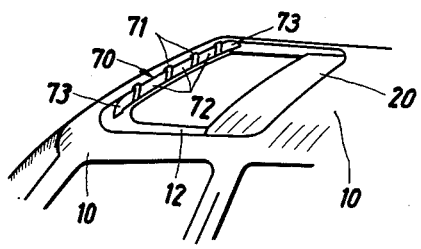
Figure 2:
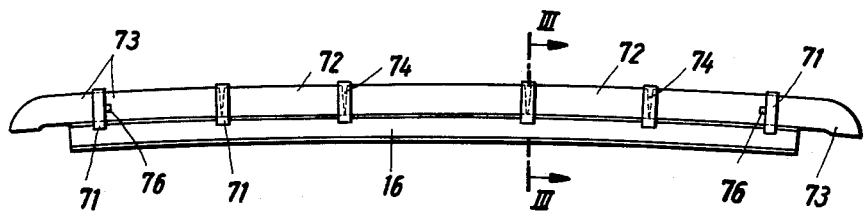
Figure 3:
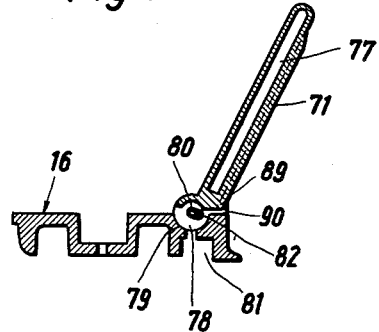

In order that the invention may be clearly understood and readily carried into effect, reference will now be made, by way of example, to the accompanying drawings, in which:

FIGURE 1 is a diagrammatic partial perspective view of a motor vehicle roof,

FIGURE 2 is a view on a larger scale than that of FIGURE 1 showing a part of the roof in a first position, FIGURE 3 shows a section taken on the line III—III of FIGURE 2, but to a yet larger scale, FIGURE 4 is a view of the part shown in FIGURE 2, but in a second postion, FIGURE 5 shows a section taken on the line V—V of FIGURE 4, but to a larger scale, FIGURE 6 shows a section taken on the line VI—VI of FIGURE 4, but to a larger scale, and FIGURE 7 shows a section taken on the line VII—VII of FIGURE 6, a further part of the roof being shown schematically.

Referring to FIGURE 1, which shows a general view of the vehicle roof, an aperture is provided in a fixed part 10 of the roof and is arranged to be closed by moving forwardly a sliding roof panel 20. The edges of the aperture are strengthened forwardly and laterally by a frame 12 which is rigidly connected to the part 10, for example by welding. The frame 12 carries lateral guide rails for the sliding roof panel 20, and for this purpose extends rearwardly below the fixed roof part 10.

Arranged on the forward transverse portion of the frame 12 is a wind deflector 70. This transverse portion has an approximately horizontal flange which extends towards the aperture and supports a guide bar 16 along which extend two driving cables for the sliding roof panel, these cables being guided to the lateral portions of the frame 12 and being connected to the panel 20.

In FIGURES 1 and 2, the wind deflector 70 is shown in its operative position which it assumes under the influence of a torsion rod 82 when the sliding roof panel 20 is opened by being slid rearwardly. The wind deflector consists substantially of a plurality of thin plates of synthetic plastic material, glass, sheet metal, or some other suitable material, held by turnable arms 71. The plates conveniently comprise, as illustrated, a plurality of rectangular plates 72 and two end plates 73, the plates being disposed end-to-end and supported at adjacent ends within the arms 71. This sub-divided construction of the deflector 70 has the advantage over a one-piece construction, that the wind deflector can be arranged along a curve, so that when pivoted upwardly and rearwardly into the operative position it can adapt itself substantially to the curved shape of the vehicle roof. As shown in FIGURE 2, when the wind deflector is moved into its operative position, there are wedge-shaped gaps 74 between neighboring ends of each two adjacent plates 72 and 73. FIGURE 4 shows a view from above of the wind deflector in the substantially horizontal inoperative position, where instead of the wedge-shaped gaps 74 there are only slight gaps 75 of substantially uniform width. Provided on the end plates 73 are stops 76 which prevent sliding of the plates 73 out of the associated arms 71.

During closing of the sliding roof, the forward transverse edge of the panel 20 contacts the rearward surfaces of the pivotable arms 71 and thereby causes downward pivotal movement of the arms 71 which are rotatably supported at their lower ends, as will be described in detail below. During this movement, the forward transverse edge of the panel 20 first contacts the arms 71 below their center and slides, during the progressive closing motion of the panel 20, along the rear surfaces of the forwardly pivoting frames, whereby said frames 71, simultaneously carry along the plates 72 and 73 positioned on said frames, which thereby are pivoted counterclockwise from their operative position as shown in FIG. 3 to their inoperative position as best seen in FIG. 7.

Each arm 71 has a slot 77 for accommodating the plates 72 and 73, and also a circularly shaped base portion 78 which is engaged in a corresponding recess 79 in the bar 16. Each base portion 78 contains a hole 80 in the form of a slot. Below the recesses 79 there is provided a continuous longitudinal groove 81 in the bar 16, in which is inserted a torsion bar or rod 82. The rod 82 comprises an open loop 84 (FIGURE 6) in which engages a fixed projection 85. Therefore, the rod 82 is at this point secured both against rotational movement and also against axial displacement. The end parts of the rod extend through the holes 80, and at least one of the end parts comprises a further looped portion 86 which takes up the entire height of the hole 80. The rod 82 is subjected to such torsional preload that the arm 71 containing the loop 86 is urged to a raised position, whereat an abutment surface 89 on the arm 71 encounters an abutment surface 90 of the bar 16. These abutment surfaces 89, 90 correspond to the desired operative position of the wind deflector.

FIGURE 6 shows that the torsion rod 82 from the right-hand side of the loop 84 onwards extends without any looping through the hole 80 of a further arm 71. At this point, the rod 82 merely serves as a support without having any spring action on this arm. Depending on the number of arms used for the wind deflector 70, for example four arms 72 as shown in FIGURE 1, or six arms 71 as shown in FIGURES 2 and 4, the number of torsion bars selected can be optionally varied, for example in such a manner that each alternate arm is operated by a torsion bar. The number of arms generally depends on the width of the sliding roof, and is so chosen that sufficient supports are available for the wind deflector to avoid vibration of the deflector by air pressure. In some cases, and particularly in the case of one-piece wind deflectors, two arms may be sufficient. It is also possible to use other springs instead of torsion springs for the automatic movement of the arms. However, the spring means used is preferably a torsion bar which extends in the longitudinal direction of the bearing bar 16 and is connected thereto and to at least one of the pivotable arms. It would be sufficient for only one of the pivotable arms to be under spring influence, because all the pivotable arms are connected together for common movement by the plates mounted there-in.

Since the wind deflector shown adapts itself, when in its operative position, to the slightly curved configuration of the bar 16, no significant gap is left between the lower edge of the wind deflector and the uppermost surface of the bar 16. However, it may be expedient to provide the bar 16 with a continuous rib 16' (FIGURE 7), which bears against the lower edge of the wind deflector when the deflector is raised.

With the construction shown, a considerable advantage is obtained in that the wind deflector in its inoperative position can be accommodated with a minimum amount of space being required between the sliding roof panel and the forward transverse portion of the frame.

I claim:

1. A vehicle roof comprising a fixed roof part, said roof part having an aperture therein, frame portions on said fixed roof part bounding forwardly and laterally said aperture therein, the frame portion forwardly bounding the aperture comprising a generally rearwardly extending flange, a movable roof part displaceable lengthwise of the vehicle roof between a closed position in which said movable roof part closes said aperture and an open position rearward of said closed position, an elongate bearing means fixedly mounted on said flange and beneath said movable roof part in said closed position, and extending widthwise of the vehicle roof, a plurality of arms spaced apart from each other along said bearing means and pivotally mounted adjacent the rear edge of said bearing means, each arm being turnable between a raised position and a lowered position in which it is located on top of said bearing means and beneath the movable roof part in said closed position, wind-deflecting plate means carried by said arms and movable by said arms between an inoperative position in which said plate means is located beneath the movable roof part in said closed position and extends approximately parallel to said movable roof part and an operative position in which said plate means projects upwardly from said fixed roof part, and a stressed, torsion rod extending longitudinally of said bearing means and acting on the one hand on said bearing means and on the other hand on said arms and urging said arms into the raised positions and thus said plate means into said operative position.

2. A vehicle roof comprising a fixed roof part, said roof part having an aperture therein, frame portions on said fixed roof part bounding forwardly and laterally said aperture therein, a movable roof part displaceable lengthwise of the vehicle roof between a closed position in which said movable roof part closes said aperture and an open position rearward of said closed position, an elongate bearing means fixedly mounted at the foremost side of said aperture and beneath the movable roof part in said closed position, and extending widthwise of the vehicle roof, a plurality of arms spaced apart from each other along said bearing means and pivotally mounted on said bearing means, each arm being turnable between a raised position and a lowered position in which it is located beneath the movable roof in said closed position, a plurality of wind-deflecting plates disposed in end-to-end relation and supported at their ends by said arms, said plates being movable by said arms from inoperative positions, in which said plates are located beneath the movable roof part in said closed position and extend approximately parallel to said movable roof part, to operative positions in which said plates project upwardly from said fixed roof part, said plates defining gaps between the ends of each two adjacent plates for permitting play between the plates, and spring means acting on the one hand on said bearing means and on the other hand on said arms and urging said arms into the raised positions and thus said plates into said operative positions.

3. A vehicle roof comprising a fixed roof part, said roof part having an aperture therein, frame portions on said fixed roof part bounding forwardly and laterally said aperture therein, a movable roof part displaceable lengthwise of the vehicle roof between a closed position in which said movable roof part closes said aperture and an open position rearward of said closed position, an elongated bearing means fixedly mounted at the foremost side of said aperture and beneath the movable roof part in said closed position, and extending widthwise of the vehicle roof, a plurality of arms spaced apart from each other along said bearing means and pivotally mounted on said bearing means, each arm being turnable between a raised position and a lowered position in which it is located beneath the movable roof in said closed position, a plurality of wind-deflecting plates disposed in end-to-end relation and supported at their ends by said arms, said plates being movable by said arms from inoperative positions, in which said plates are located beneath the movable roof part in said closed position and extend approximately parallel to said movable roof part to operative positions in which said plates project upwardly from said fixed roof part, said plates defining gaps between the ends of each two adjacent plates for permitting play between the plates, portions of said arms covering said gaps, and spring means acting on the one hand on said bearing means and on the other hand on said arms and urging said arms into the raised positions and thus said plates into said operative positions.

4. A vehicle roof comprising a fixed roof part, said roof part have an aperture therein, frame portions on said fixed roof part bounding forwardly and laterally said aperture therein, a movable roof part displacement lengthwise of the vehicle roof between a closed position in which said movable roof part closes said aperture and an open position rearward of said closed position, an elongate bearing means fixedly mounted at the foremost side of said aperture and beneath the movable roof part in said closed position, and extending widthwise of the vehicle roof, a plurality of arms spaced apart from each other along said bearing means and pivotally mounted on said bearing means, each arm being turnable between a raised position and a lowered position in which it is located beneath the movable roof in said closed position, wind-deflecting plate means carried by said arms and movable by said arms between an inoperative position in which said plate means is located beneath the movable roof part in said closed position and extends approximately parallel to said movable roof part and an operative position in which said plate means projects upwardly from said fixed roof part, portions of said arms defining slots in said arms accommodating said plate means, and spring means acting on the one hand on said bearing means and on the other hand on said arms and urging said arms into the raised positions and thus said plate means into said operative position.

5. A vehicle roof comprising a fixed roof part, said roof part having an aperture therein, frame portions on said fixed roof part bounding forwardly and laterally said aperture therein, a movable roof part displaceable lengthwise of the vehicle roof between a closed position in which said movable roof part closes said aperture and an open position rearward of said closed position, an approximately horizontal flange on said fixed roof part providing the foremost portion of said frame portion and projecting towards said aperture, a bearing bar fixedly mounted on said horizontal flange beneath said movable roof part in the closed position, and extending widthwise of the vehicle roof, portions of said bar defining channels therein extending longitudinally of the bar for accommodating driving cables for said movable roof part, a plurality of arms spaced apart from each other along said bar and pivotally mounted on said bar, each arm being turnable between a raised position and a lowered position in which it is located beneath the movable roof part in said closed position, wind-deflecting plate means carried by said arms and movable by said arms between an inoperative position in which said plate means is located beneath the movable roof part in said closed position and extends approximately parallel to said movable roof part and an operative position in which said plate means projects upwardly from said fixed roof part, and spring means acting on the one hand on said bar and on the other hand on said arms and urging said arms into the raised positions and thus said plate means into said operative position.

6. A vehicle roof comprising a fixed roof part, said roof part having an aperture therein, frame portions on said fixed roof part bounding forwardly and laterally said aperture therein, a movable roof part displaceable lengthwise of the vehicle roof between a closed position in which said movable roof part closes said aperture and an open position rearward of said closed position, an elongated bearing means fixedly mounted at the foremost side of said aperture and beneath the movable roof part in said closed position, and extending widthwise of the vehicle roof, a plurality of arms spaced apart from each other along said bearing means and pivotally mounted at pivoted ends on said bearing means, each arm being turnable rearwardly from a lowered position, in which the arm extends forwardly of its pivoted end and in which the arm is located beneath the movable roof part in said closed position, to a raised position in which the arm extends upwardly and rearwardly of its pivoted end, limiting means cooperating with said arms to stop rearward movement of said arms beyond their raised positions, forward portions of said movable roof part co-operating with said arms to turn said arms forwardly into their lowered positions during closing of said movable roof part, wind-deflecting plate means carried by said arms and movable by said arms between an inoperative position in which said plate means is located beneath said movable roof part in closed position and extends approximately parallel to said movable roof part and an operative position in which said plate means projects upwardly from said fixed roof part, and spring means acting on the one hand on said bearing means and on the other hand on said arms and urging said arms into the raised positions and thus said plate means into said operative position.

References Cited by the Examiner

FOREIGN PATENTS 1,001,129 1/57 Germany.
1,019,574 11/57 Germany.
1,022,481 1/58 Germany.

BENJAMIN HERSH, *Primary Examiner.*

A. HARRY LEVY, *Examiner.*